United States Patent [19]

Argabright et al.

[11] 4,040,258

[45] * Aug. 9, 1977

[54] METHOD OF CONSOLIDATING PARTICLES

[75] Inventors: Perry A. Argabright, Larkspur; C. Travis Presley, Littleton, both of Colo.

[73] Assignee: Marathon Oil Company, Findlay, Ohio

[*] Notice: The portion of the term of this patent subsequent to Dec. 3, 1991, has been disclaimed.

[21] Appl. No.: 498,017

[22] Filed: Aug. 16, 1974

[51] Int. Cl.² .............................................. E02D 3/12
[52] U.S. Cl. .................................. 61/36 C; 166/293; 166/294; 166/295
[58] Field of Search ..................... 260/42.12; 166/293, 166/294, 295; 61/36 C

[56] References Cited

U.S. PATENT DOCUMENTS

| | | | |
|---|---|---|---|
| 3,378,070 | 4/1968 | Wessler et al. | 166/293 |
| 3,384,173 | 5/1968 | Nahin et al. | 166/295 |
| 3,705,627 | 12/1972 | Argabright et al. | 166/295 |
| 3,762,476 | 10/1973 | Gall | 166/294 |

*Primary Examiner*—V. P. Hoke
*Attorney, Agent, or Firm*—Joseph C. Herring; Jack L. Hummel

[57] ABSTRACT

Loose particles are consolidated, e.g., to prevent them from falling into well bores in producing wells, by contacting the loose particles with a solution having a pH above 7 containing water-soluble polymer, e.g., polyvinyl alcohol and hydroxyethyl cellulose, and a polyisocyanurate salt and maintaining said contact for a time sufficient to cause the formation of a consolidating matrix.

6 Claims, 3 Drawing Figures

METHOD OF CONSOLIDATING PARTICLES

DESCRIPTION OF THE PRIOR ART

U.S. Pat. No. 3,056,766 teaches aqueous gels of bis-acrylamide polymer and water-soluble metal salts and their use of soil conditioners, U.S. Pat. No. 3,136,360 teaches the use of acrylamide gels mixed with filter aids, e.g., diatomaceous earth to seal off permeable zones or sections in earth formations; U.S. Pat. No. 3,152,641 teaches copolymerizing bis-acrylamide with water-soluble ethylenic monomer, e.g., acrylamide in situ in subterranean areas for the purpose of sealing such areas; U.S. Pat. No. 3,199,588 teaches plugging of formations with aqueous bis-acrylamide plus ethylenic copolymer which polymerizes slowly in place; U.S. Pat. No. 3,199,589 teaches adding ascorbic acid to bis-acrylamide plus phenolic mixture in a well to cause polymerization in situ; U.S. Pat. No. 3,223,161 teaches a sand consolidated with bis-acrylamide polymerized by contact with $SO_2$; U.S. Pat. No. 3,437,625 teaches aqueous alkali metal silicates plus aqueous formaldehyde/acrylamide polymer as consolidating agents for soil; U.S. Pat. No. 2,819,239 teaches compositions for cementing wells comprising Portland cement, a latex of a vinylidene chloride copolymer containing acrylonitrile, vinyl chloride, or vinyl acetate and a non-ionic wetting agent; U.S. Pat. No. 3,646,999 teaches epoxy resin consolidation of permeable masses, U.S. Pat. No. 3,684,011 (docket 690059-A-USA) and U.S. Pat. No. 3,682,245 (docket 690062-A-USA) teach mobility control in oil recovery processes by reducing permeability of reservoirs by injecting aqueous solutions of compounds, e.g., isocyanuric acid and derivatives and hydrolyzing to precipitate over a pH dependent time period.

None of the above teach the use of polyisocyanurates or copolymers thereof for the consolidation of loose particles, e.g., sand.

SUMMARY

General Statement of the Invention

According to the present invention, aqueous solutions of polyisocyanurate salts adjusted to pH above 7 (the pH adjustment being selected to obtain the preferred time for gelation), containing a water-soluble polymer, are injected into unconsolidated masses of loose particles. After a time period, the aqueous solution becomes a gel which consolidates the loose particles.

The aqueous solutions are produced by mixing together a water-soluble polymer, e.g., polyvinyl alcohol, or hydroxyethyl cellulose with compositions containing in a single molecule the following groups;

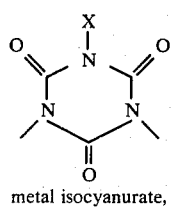

metal isocyanurate,

-continued

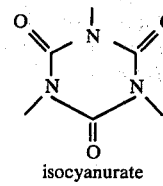

isocyanurate

The agents of the present invention have the advantage of giving a controllable time to onset of gelation. That is, by merely adjusting the pH of the initial solution, the gelation time may be controlled, a feature not available with conventional systems.

The polyisocyanurate compounds of the present invention have the general structure shown in FIG. 1:

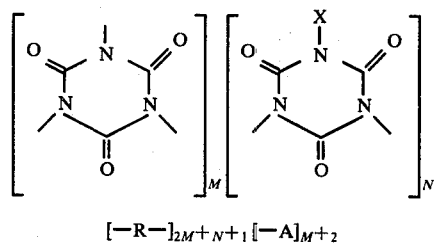

$[-R-]_{2M+N+1}[-A]_{M+2}$ where:
R = divalent hydrocarbon or substituted hydrocarbon radical, as described below and exemplified in FIG. 2.

X = a metal or hydrogen or quaternary ammonium (which, for the purposes of this invention, acts like a metal) or a combination thereof. Particularly preferred are hydrogen, quaternary ammonium and metals selected from the following groups of the Periodic Table; Ia, Ib, IIa, IIb, IIIa, IIIb, IVa, IVb, Va, Vb, VIa; including such metals as Li, Na, K, Rb, Cs, Ag, Au, Be, Mg, Ca, Sr, Ba, Ra, Zn, Cd, Hg, B, Al, Sc, Y, La, and the other rare earths, Ac, Ga, In, Tl, Ti, Zr, Hf, Ge, Sn, Pb, V, Nb, Ta, Sb, Bi, Cr, Mo, W, Mn, Fe, Ru, Co, Ni, Rh, Pd, Os, and Ir.

A = a monovalent organic radical selected from the following:
isocyanate (—NCO), urethane (—NHCO$_2$R'), urea (—NHCONHR'), amino —NH$_2$,—NHR', —NR$_2$')

R' = monovalent hydrocarbon or substituted hydrocarbon radical, as discussed below;

M = average number of trisubstituted isocyanurate rings and is a positive number from 0 to about 400, and most preferably from 0 to about 200.

N = average number of isocyanuric acid and/or isocyanurate salt groups and is a positive number from about 1 to about 10,000, more preferably from 2 to about 1000, and most preferably from 3 to about 100.

2M+N+1 = average number of divalent R groups and is a positive integer from 2 to about 11,000, more preferably from 3 to about 1,100 and most preferably from 4 to about 140.

M+2 = average number of A groups and is a positive integer from 2 to about 400, and more preferably from 2 to about 200;

and wherein there are no N-to-N bonds and no A-to-N bonds and no A-to-A bonds and no R-to-R bonds.

R preferably contains 2 to 40, more preferably 2 to 30, and most preferably 2 to 18 carbon atoms.

R' preferably contains 1 to 40 carbon atoms, more preferably 1 to 20 carbon atoms and most preferably 1 to 10 carbons, for example, —CH₃, —C₂H₅, —C₃H₇, i—C₃H₇—,

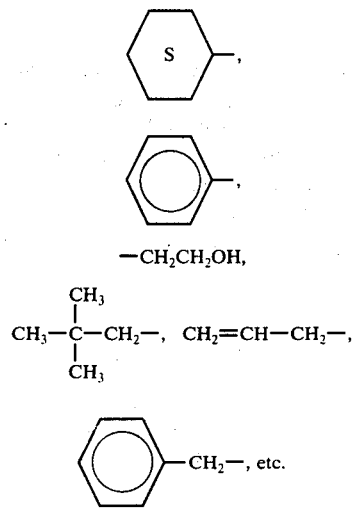

The present invention is particularly useful for the consolidation of masses of loose particles, e.g., sand or disaggregate rock, sawdust, or metal particles surrounding a well bore, trench, etc.

Application of the ungelled liquid can readily by accomplished by spraying, pouring, sprinkling, or any other wide variety of other conventional techniques for application of liquids to porous masses utilizing either especially designed equipment or conventional equipment as desired.

DESCRIPTION OF THE PREFERRED EMBODIMENTS

Figure 1:
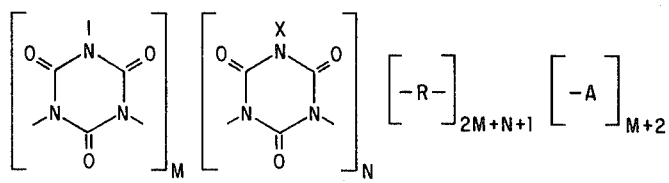
FIG. 1 shows a general formula of the polyisocyanurate starting materials of the present invention.
Figure 2:
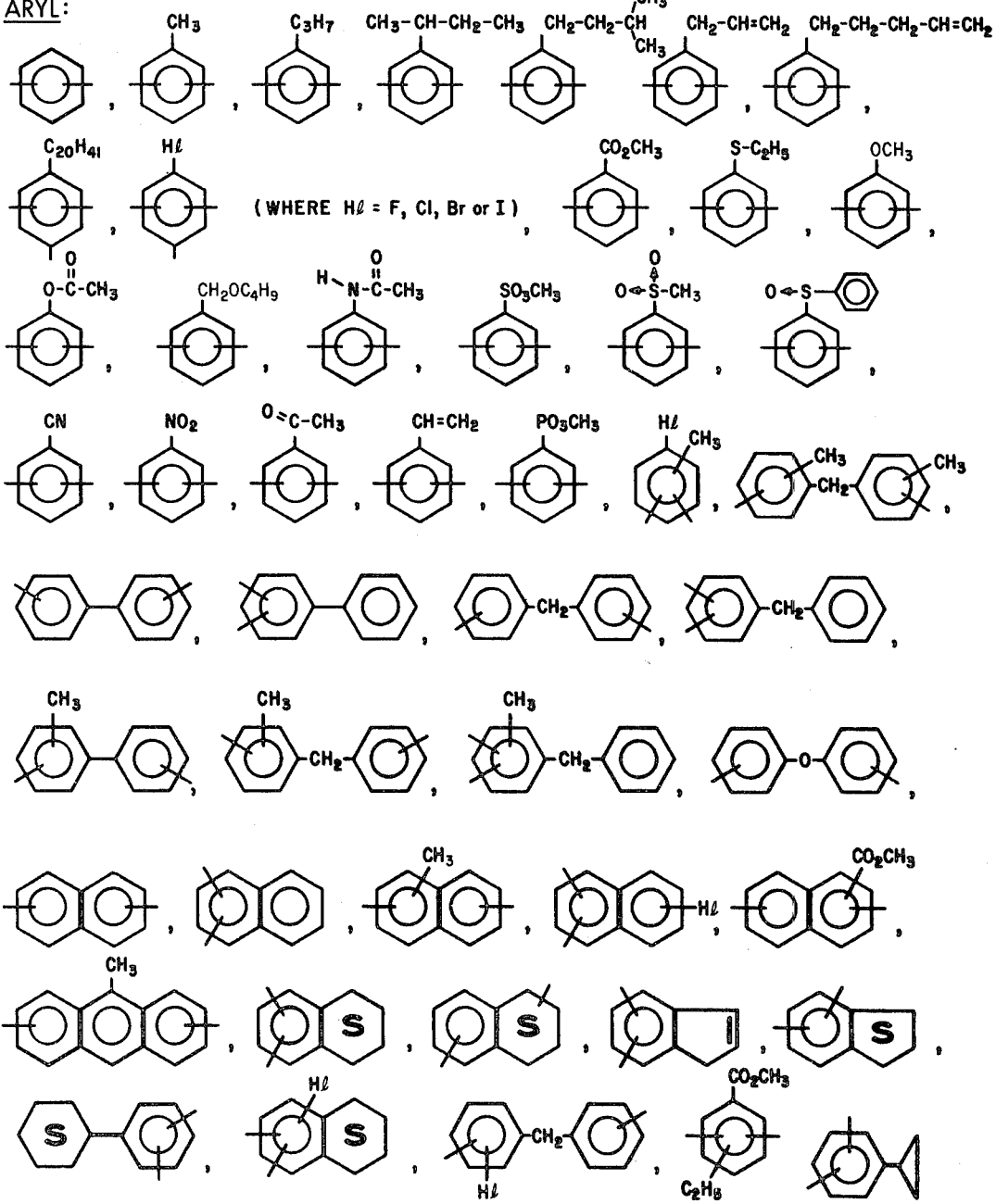
FIGS. 2 and 3 exemplify some of the possible structures of R groups of a polyisocyanurate starting material and products of the present invention.
Figure 3:
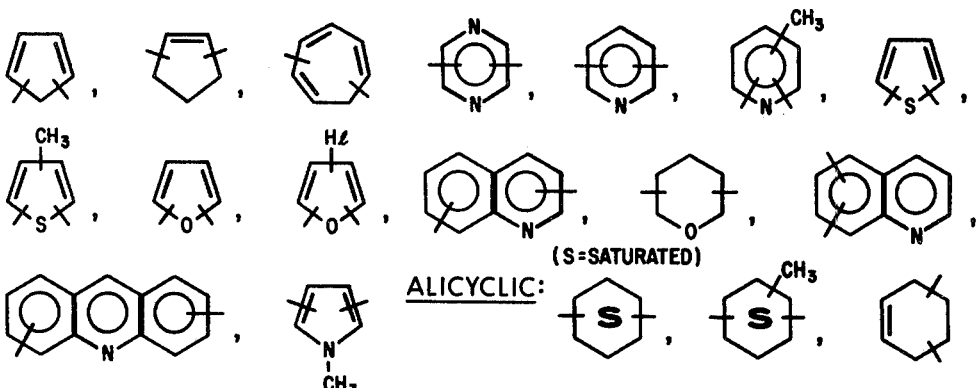

Starting Materials; the gels of the present invention can be formulated according to the application Ser. No. 173,892 filed Aug. 23, 1971 now, U.S. Pat. No. 3,779,968 issued Dec. 18, 1973. The techniques of this and the other related applications, all of which are to be considered as incorporated herein, can be utilized with the present invention.

The starting materials for the present invention are —
Salts of polyisocyanuric acids
These are produced according to the techniques taught in U.S. Pat. No. 3,573,259, by reacting a metal cyanate and an organic diisocyanate in the presence of an aprotic solvent to form isocyanurate-containing polyisocyanate metal salts. Preferably 0.5 to about 50% by weight, more preferably 1.0 to about 25% by weight, and most preferably 2.0 to about 10% by weight of such salts are employed in formulating the gels.

Water-Soluble Polymers
Water-soluble polymers for use with the present invention can be any which form gels in conjunction with polyisocyanurate salts as used in the invention. However, the most preferred polymers will be polyvinyl alcohol, and hydroxyethyl cellulose or mixtures thereof. In general, the water-soluble polymers should have molecular weight within the range of from about 2000 to about 250,000, more preferably from about 3000 to about 200,000, and most preferably from about 10,000 to about 125,000, In general, about 1.0 to about 10.0, more preferably 2.0 to about 6.0, and most preferably 3.0 to about 5.0 percent by weight of the water-soluble polymer will be contacted with the aforementioned isocyanurate salt starting materials.

All of the water-soluble polymers can be of commercial quality but highly refined and crude materials can be utilized in specialized instances where desired.

Polyvinyl alcohol is exemplified by that marketed by Monsanto Chemical Company of St. Louis, Missouri under its trade name "Gelvatol."

The hydroxyethyl cellulose is exemplified by that marketed by Hercules of Delaware under the trade name Natrosol 250.

Bases
While not narrowly critical, the bases employed with the present invention will preferably be alkali metal hydroxides, e.g., NaOH, KOH, LiOH, and alkaline earth metal hydroxides, e.g., Ca(OH)₂, etc. The alkali metal hydroxides will be more preferred, with sodium hydroxide being the most preferred of the bases. In general, the pH will be adjusted into a range of above 7, more preferably from about 7.5 to about 15, and most preferably from about 12 to about 15.

Temperature
While not narrowly critical, temperatures in the range of from about 0° C. to about 65° C. are preferred, with 5° C. to about 60° C. being more preferred, and 15° C. to 50° C. being most preferred. The lower limit is generally the freezing point of the solution and the upper limit is generally the thermal instability point of the gel.

Time
The reaction time, of course, is dependent on the initial concentration of the starting materials and the temperature. The time is preferably from 0.01 to 4800, more preferably 0.05 to 350, and most preferably about 0.06 to about 200 hours.

EXAMPLES

EXAMPLE I

Preparation of Polyisocyanurate salt

A 3-liter, 4-necked glass reactor, equipped with a motor-driven stirrer, reflux condenser, thermometer and adaptor for introducing liquid is charged with 82.4 grams of potassium cyanate (1.01 moles) and 2 liters of anhydrous dimethylformamide. To the resulting slurry at 75° F., 131 ml of tolylenediisocyanate (0.925 mole) is added dropwise at a rate of 0.428 ml per minute by means of a motor-driven syringe pump. After the addition is complete, the mixture is allowed to react an additional 5 minutes, 300 ml of methanol added, the temperature permitted to drop to room temperature (23° C.) and allowed to stir an additional 48 hours. The desired product is collected by filtration of the crude reaction mixture, extracted with acetone in a Soxhlet apparatus and dried to give 250.6 grams of a white solid. The polyisocyanurate salt product is water soluble but relatively insoluble in hydrocarbon solvents. The ratio of aromatic rings to end groups,

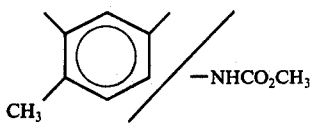

is measured by nuclear magnetic resonance, using $D_2O$ as the solvent, was found to be 17.0. Additional analyses shows that the product could contain 12% by weight of dimethylformamide. This product is used without further purification in all of the subsequent examples.

EXAMPLE II

Consolidation of Sand

An unconsolidated sand pack is prepared from clean sea sand by packing the sand into a vertical tube of 7.6 cm diameter and 8.8 cm length. The initial permeability is determined to be approximately 5 darcies. A solution composed of 3% polyisocyanurate salt as prepared in Example I, 4% polyvinyl alcohol (a 4% solution of the polyvinyl alcohol as used herein has a viscosity in the range of 28 to 32 centipoises at 20° C) and 4% sodium hydroxide in water is injected in sufficient quantity to saturate the sand pack (175 ml). After approximately 120 hours, the sand pack was rendered solid.

EXAMPLE III

Consolidation of Disaggregated Limestone

Results identical to those obtained in Example II are obtained when disaggregated Limestone (screen size less than 80 mesh) is substituted for the sea sand, the techniques being otherwise identical with those of Example II.

EXAMPLE IV

Results identical to those obtained in Example II are obtained when spent oil shale (screen size less than 80 mesh) is substituted for the sea sand, the techniques being otherwise identical with those of Example II.

EXAMPLE V

Results identical to those obtained in Example II are obtained when Arapahoe County, Colorado soil (screen size less than 80 mesh) is substituted for the sea sand, the techniques being otherwise identical with those of Example II.

Modifications of the Invention

It should be understood that the invention is capable of a variety of modifications and variations which will be made apparent to one skilled in the art by a reading of the specification and which are to be included within the spirit of the claims appended thereto.

What is claimed is:

1. A process for increasing the strength and stability of a permeable mass comprising initially unconsolidated particles which process comprises:
   a. preparing an aqueous solution containing a water-soluble salt of a polyisocyanuric acid in a concentration from about 0.5 to about 50% by weight and a water-soluble polymer in a concentration from about 1.0 to about 10.0% by weight selected from the group consisting of polyvinyl alcohol, hydroxyethyl cellulose, and mixtures thereof,
   b. adjusting the pH of said aqueous solution as desired for a given application, said pH always being in excess of 7,
   c. applying said aqueous solution to said unconsolidated particles and maintaining contact between said unconsolidated particles and said aqueous solution for a time sufficient to permit gelatin and the formation of a consolidated matrix containing said particles.

2. A process according to claim 1 wherein said isocyanurate salt has the structure:

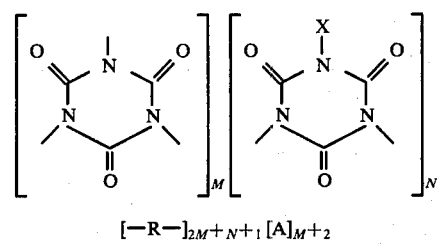

$[-R-]_{2M+N+1} [A]_{M+2}$ where
R = divalent radical
X = a metal, hydrogen, quaternary ammonium, or a combination thereof,
A = monovalent group selected from the following: isocyanate, urethane, urea, amino, $NH\ CO_2R'$,
R' = monovalent radical
M = average number of trisubstituted isocyanurate rings
N = average number of isocyanuric acid or derivative rings
2M+N+1 = average number of divalent R groups
M+2 = average number of A groups.

3. The process according to claim 1 wherein said permeable mass comprises the surface of a depression in the ground and wherein said depression is, after treatment according to claim 1, utilized as a reservoir for liquids.

4. A process according to claim 1 wherein said water soluble polymer comprises polyvinyl alcohol.

5. A process according to claim 1 wherein said water soluble polymer comprises hydroxyethyl cellulose.

6. An article of manufacture comprising unconsolidated particles having void space, said void space being at least partially filled with the gelatinous product produced by
   a. preparing an aqueous solution containing a water-soluble salt of a polyisocyanuric acid in a concentration of about 0.5 to about 50% by weight of the salts and a water-soluble polymer selected from the group consisting of polyvinyl alcohol, hydroxyethyl cellulose, and mixtures thereof, in a concentration of about 1.0 to about 10.0% by weight,
   b. adjusting the pH of said aqueous solution as desired for a given application always having a pH in excess of 7,
   c. applying said aqueous solution to said unconsolidated particles and maintaining contact between said particles and said aqueous solution for a time sufficient to permit gelation within the void space of said particles.

* * * * *